United States Patent
Nakamura et al.

(10) Patent No.: US 8,780,226 B2
(45) Date of Patent: Jul. 15, 2014

(54) IMAGE RECORDING DEVICE AND METHOD WHICH GENERATES MULTI-IMAGE FILE BASED ON CLASSIFICATION

(75) Inventors: Satoshi Nakamura, Saitama (JP); Takeshi Misawa, Saitama (JP); Mikio Watanabe, Saitama (JP); Fumio Nakamaru, Saitama (JP); Hisashi Endo, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 263 days.

(21) Appl. No.: 12/989,552

(22) PCT Filed: Apr. 14, 2009

(86) PCT No.: PCT/JP2009/057485
§ 371 (c)(1),
(2), (4) Date: Dec. 27, 2010

(87) PCT Pub. No.: WO2009/131034
PCT Pub. Date: Oct. 29, 2009

(65) Prior Publication Data
US 2011/0122291 A1    May 26, 2011

(30) Foreign Application Priority Data
Apr. 25, 2008    (JP) .................................. 2008-116056

(51) Int. Cl.
*H04N 5/76*    (2006.01)
(52) U.S. Cl.
USPC ........................................ 348/231.2; 382/224
(58) Field of Classification Search
USPC ................. 348/231, 231.2; 382/224
See application file for complete search history.

(56) References Cited

U.S. PATENT DOCUMENTS

| 5,796,428 A | 8/1998 | Matsumoto et al. |
| 6,229,566 B1 | 5/2001 | Matsumoto et al. |
| 6,590,608 B2 | 7/2003 | Matsumoto et al. |
| 2002/0067420 A1 | 6/2002 | Oeda et al. |

(Continued)

FOREIGN PATENT DOCUMENTS

| EP | 0 860 735 A2 | 8/1998 |
| EP | 1 785 896 A2 | 5/2007 |

(Continued)

OTHER PUBLICATIONS

International Preliminary Report on Patentability and Written Opinion, dated Dec. 23, 2010, issued in parent application PCT/JP2009/057485, 15 pages in English and Japanese.

(Continued)

*Primary Examiner* — Usman Khan
(74) *Attorney, Agent, or Firm* — Sughrue Mion, PLLC

(57) ABSTRACT

The presence/absence of a face in an image and the type of imaging mode during imaging (such as a landscape imaging mode and a close-up imaging mode) of the image acquired by imaging and the like are detected. Images are automatically classified by groups based on the detected information (classification information). A plurality of images classified by the groups are connected to create a multi-image file (MP file), and the MP file is recorded in a recording medium. As a result, the plurality of classified images can be managed altogether (without dissipation), and the plurality of classified images can be reproduced by providing the multi-image file even if a reproducer does not have a classification function.

15 Claims, 8 Drawing Sheets

(56) References Cited

U.S. PATENT DOCUMENTS

| | | |
|---|---|---|
| 2004/0264810 A1 | 12/2004 | Taugher et al. |
| 2006/0268159 A1* | 11/2006 | Orimoto et al. ............... 348/373 |
| 2007/0211150 A1* | 9/2007 | Hirata ........................ 348/211.6 |
| 2007/0269140 A1* | 11/2007 | Nagasaka ..................... 382/309 |
| 2009/0135269 A1 | 5/2009 | Nozaki et al. |

FOREIGN PATENT DOCUMENTS

| | | |
|---|---|---|
| JP | 7-123307 A | 5/1995 |
| JP | 10-243331 A | 9/1998 |
| JP | 2001-111938 A | 4/2001 |
| JP | 2003-111013 A | 4/2003 |
| JP | 2006-332824 A | 12/2006 |
| JP | 2007-148691 A | 6/2007 |
| WO | 2006080755 A1 | 8/2006 |
| WO | WO 2006080755 A1 * | 8/2006 |

OTHER PUBLICATIONS

Communication, dated Jun. 21, 2011, issued in corresponding EP Application No. 09733828.9, 8 pages.
Davis et al., "From Context to Content: Leveraging Context to Infer Media Metadata," Proceedings of the ACM International Conference on Multimedia, Dec. 31, 2004, pp. 188-195, XP002374239.

* cited by examiner

IMAGE RECORDING DEVICE AND METHOD WHICH GENERATES MULTI-IMAGE FILE BASED ON CLASSIFICATION

TECHNICAL FIELD

The present invention relates to an image recording device and a method, and particularly, to a technique of organizing and recording images.

BACKGROUND ART

Conventionally, an image recording/reproducing device is proposed, the device creating and recording a film list including a film header and a plurality of pieces of photograph information, and in addition to the film list, an album list indicating results of classification of the photograph information (result of classification using accompanied information related to images), reading out the album list during album reproduction, and reading out corresponding image information from the film list based on the album list to display the album (Patent Literature 1).

A video imaging/recording device is also proposed, the device grouping image data including location information, such as GPS information, based on location information, adding the grouping information (such as names of places) to the header of the image data, and thereby being capable of reducing labor hour of the user managing the image data (Patent Literature 2).

Furthermore, an image processing device is proposed, the device capable of recognizing a face in a photographed image, determining whether the person is a registered person registered in advance, and if the face is registered, recording the photographed image in a recording folder classified by the registered persons (Patent Literature 3).

CITATION LIST

Patent Literature

PTL 1: Japanese Patent Application Laid-Open No. 1995-123307
PTL 2: Japanese Patent Application Laid-Open No. 2003-111013
PTL 3: Japanese Patent Application Laid-Open No. 2007-148691

SUMMARY OF INVENTION

Technical Problem

The device described in Patent Literature 1 separately creates and records the film list and the album list. Therefore, if an operation, such as a separate deletion or movement of the lists, is performed, there is a problem that the album cannot be reproduced. Furthermore, a reproducer without a dedicated reproduction function of executing a reproduction process based on the album list cannot display the album.

The device described in Patent Literature 2 classifies the photographed images based on the location information. Therefore, the device cannot group photographed images taken at approximately the same imaging location into different classifications. Furthermore, the invention described in Patent Literature 2 is designed to add the grouping information to the header of the image data to manage the image data (content), and the images are not reproduced (album reproduction) group by group.

The invention described in Cited Document 3 can classify the photographed images by the registered persons. However, the photographed images cannot be classified by conditions other than the registered persons, and the photographed images cannot be classified into desired groups.

Furthermore, the images are recorded in separate files in the inventions described in Patent Literatures 2 and 3. Therefore, there is a problem that the classified files are easily dissipated.

The present invention has been made in view of the foregoing circumstances, and an object of the present invention is to provide an image recording device and a method capable of easily managing a plurality of images classified group by group, improving the viewability of the group-by-group images, and automatically classifying the images into desired groups.

Solution to Problems

To attain the object, a first aspect of the present invention provides an image recording device comprising: an image acquisition unit that acquires a plurality of images; a group determination unit that determines a group of each image acquired by the image acquisition unit; a file creating unit that connects group-by-group images classified by the groups determined by the group determination unit to create a multi-image file; and a recording unit that records the group-by-group multi-image file created by the file creating unit.

The group determination unit can automatically classify the acquired images by the groups, and the file creating unit connects the plurality of images classified by the groups to create a multi-image file. Therefore, the plurality of classified images can be managed altogether (without dissipation). Furthermore, the plurality of classified images can be easily reproduced by providing the multi-image file even if a reproducer does not have a classification function.

A second aspect of the present invention provides the image recording device according to the first aspect, wherein the group determination unit comprises a classification information acquisition unit that acquires, for each image acquired by the image acquisition unit, at least one of presence/absence of a face in the image, a type of imaging mode, an imaging location, imaging date/time, and an imaging time zone as classification information, and the group determination unit determines the groups of the acquired images based on the acquired classification information.

A third aspect of the present invention provides the image recording device according to the second aspect, wherein the classification information acquisition unit acquires the classification information from information set or detected during photographing of the images or acquires the classification information from adjunct information added to header sections of the respective images.

A fourth aspect of the present invention provides the image recording device according to the second or third aspect, wherein the classification information acquisition unit further comprises a classification information setting unit that arbitrarily sets a type of the classification information to be acquired, and the classification information acquisition unit acquires the classification information set by the classification information setting unit for each image acquired by the image acquisition unit. As a result, the images can be grouped into desired groups set by the user.

A fifth aspect of the present invention provides the image recording device according to any one of the first to fourth aspects, wherein the group determination unit, the file creating unit, and the recording unit are triggered by the completion of the acquisition of the images by the image acquisition unit to operate. As a result, the multi-image file can be created without being conscious of the grouping.

A sixth aspect of the present invention provides the image recording device according to any one of the first to fifth aspects, wherein the image acquisition unit comprises an imaging unit that images a subject and acquires an image expressing the subject imaged by the imaging unit based on input of an imaging instruction. In other words, the image recording device can be incorporated into an imaging device, such as a digital camera.

A seventh aspect of the present invention provides the image recording device according to any one of the first to fourth aspects, further comprising: an instruction input unit that instructs creation and recording of a multi-image file; and an internal memory or a recording medium recording images, wherein the image acquisition unit acquires a plurality of images from the internal memory or the recording medium, and the file creating unit and the recording unit are triggered by input of an instruction by the instruction input unit to operate. As a result, the multi-image file can be created at arbitrary timing.

An eighth aspect of the present invention provides the image recording device according to any one of the first to seventh aspects, wherein if the image acquisition unit acquires a new image, the group determination unit determines a group corresponding to the acquired new image, and there is no existing multi-image file corresponding to the determined group, the file creating unit creates a new multi-image file for recording the acquired new image.

A ninth aspect of the present invention provides the image recording device according to any one of the first to eighth aspects, wherein if the image acquisition unit acquires a new image, and the group determination unit determines a group corresponding to the acquired new image, the file creating unit updates an existing multi-image file corresponding to the determined group to connect the acquired new image to an image of the existing multi-image file, and the recording unit records the existing multi-image file updated by the file creating unit. The existing multi-image file can be updated by appending a new image to the existing multi-image file or by rewriting the existing multi-image file to which the new image is added.

A tenth aspect of the present invention provides an image recording method comprising: an image acquisition step for acquiring one or a plurality of images; a group determination step for determining groups of the acquired images; a file creation step for creating a multi-image file formed by connecting the determined group-by-group images; and a recording step for recording the created group-by-group multi-image file.

An eleventh aspect of the present invention provides the image recording method according to the tenth aspect, wherein the group determination step comprises a classification information acquisition step for acquiring, for each acquired image, at least one of presence/absence of a face in the image, a type of imaging mode, an imaging location, imaging date/time, and an imaging time zone as classification information, and the groups of the acquired images are determined in the group determination step based on the acquired classification information.

A twelfth aspect of the present invention provides the image recording method according to the eleventh aspect, wherein in the classification information acquisition step, the classification information is acquired from information set or detected during photographing of the images, or the classification information is acquired from adjunct information added to header sections of the respective images.

A thirteenth aspect of the present invention provides the image recording method according to the eleventh or twelfth aspect, wherein the classification information acquisition step further comprises a classification information setting step for arbitrarily setting a type of the classification information to be acquired, and in the classification information acquisition step, the classification information set in the classification information setting step is acquired for each image acquired in the image acquisition step.

A fourteenth aspect of the present invention provides the image recording method according to any one of the tenth to thirteenth aspects, further comprising a step for detecting the completion of the acquisition of the images in the image acquisition step, wherein the group determination step, the file creation step, and the recording step are sequentially executed when the completion of the acquisition of the images is detected.

A fifteenth aspect of the present invention provides the image recording method according to any one of the tenth to fourteenth aspects, wherein the image acquisition step comprises an imaging step for imaging a subject based on input of an imaging instruction, and in the image acquisition step, an image expressing the subject imaged in the imaging step is acquired.

A sixteenth aspect of the present invention provides the image recording method according to any one of the tenth to thirteenth aspects, further comprising: an instruction input step for instructing creation and recording of a multi-image file; and the image acquisition step for acquiring a plurality of images from an internal memory or a recording medium recording images, wherein the file creation step and the recording step are sequentially executed when there is input of an instruction in the instruction input step.

A seventeenth aspect of the present invention provides the image recording method according to any one of the tenth to sixteenth aspects, wherein if a new image is acquired in the image acquisition step, a group corresponding to the new image acquired in the group determination step is determined, and there is no existing multi-image file corresponding to the determined group, a new multi-image file for recording the acquired new image is created in the file creation step.

An eighteenth aspect of the present invention provides the image recording method according to any one of the tenth to seventeenth aspects, wherein if a new image is acquired in the image acquisition step, and a group corresponding to the acquired new image is determined in the group determination step, an existing multi-image file corresponding to the determined group is updated in the file creation step to connect the acquired new image to an image of the existing multi-image file, and the existing multi-image file updated in the file creation step is recorded in the recording step.

Advantageous Effects of Invention

A plurality of images classified by groups are connected to create a multi-image file. Therefore, the plurality of classified images can be managed altogether (without dissipation). Furthermore, the plurality of images classified by the groups can be browsed (album reproduction) by providing the multi-image file to a reproducer even if the reproducer does not have a classification function.

DESCRIPTION OF EMBODIMENTS

Hereinafter, preferred embodiments of an image recording device and a method according to the present invention will be described in accordance with the attached drawings.

Configuration of Digital Camera

Figure 1:
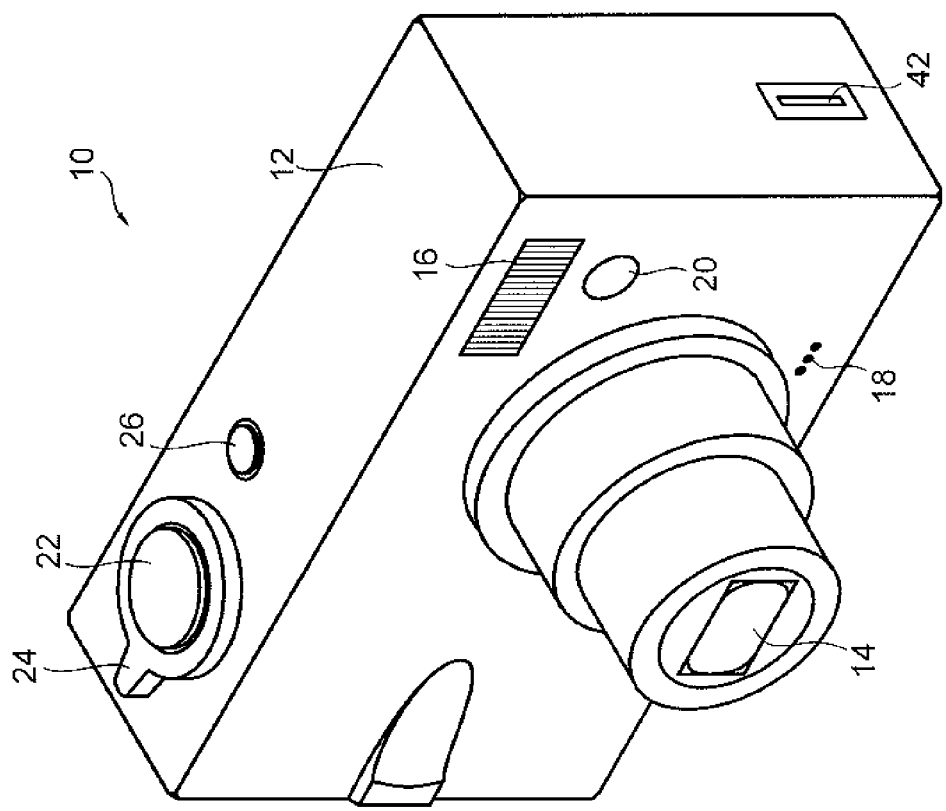
FIG. 1 is a front perspective view showing an external configuration of a digital camera to which the present invention is applied.
Figure 2:
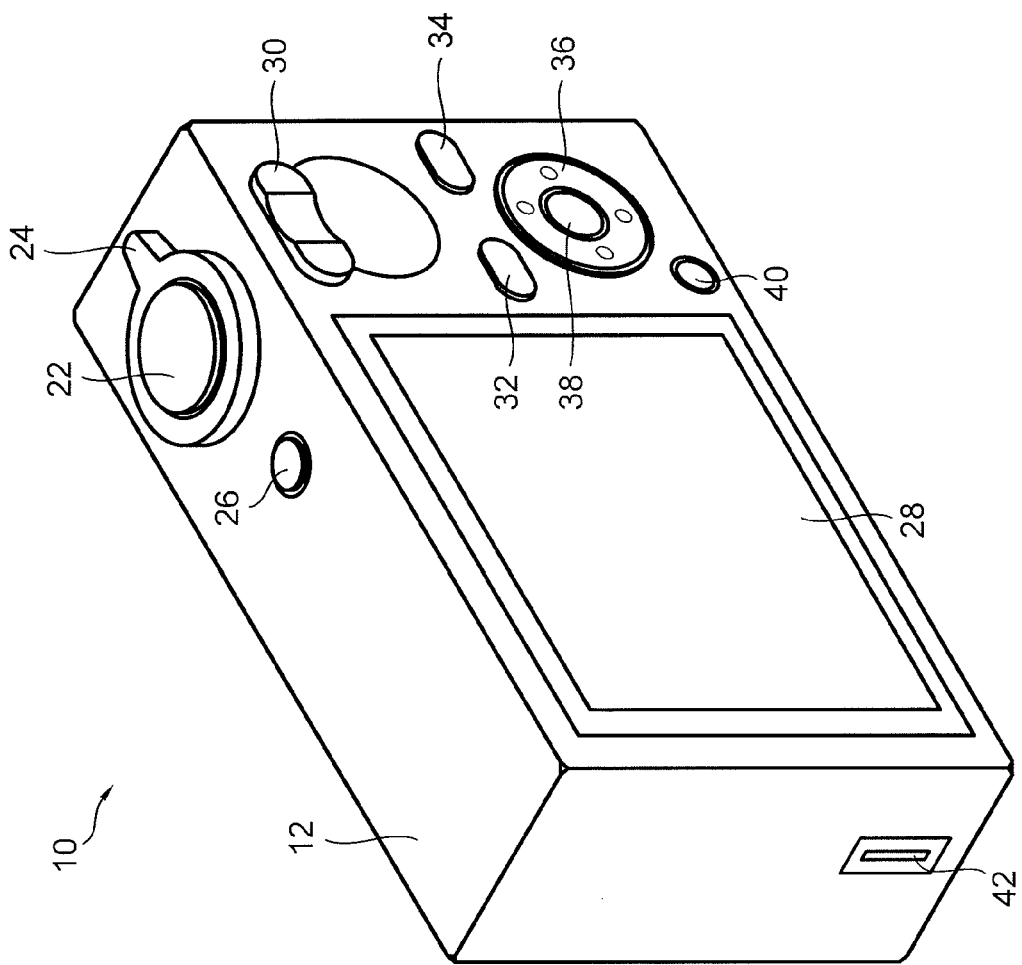
FIG. 2 is a back perspective view showing an external configuration of the digital camera to which the present invention is applied.

FIGS. 1 and 2 are a front perspective view and a back perspective view, respectively, showing external configurations of a digital camera to which the image recording device according to the present invention is applied.

As shown in FIGS. 1 and 2, the digital camera 10 is a so-called compact camera, and a camera body (camera main body) 12 of the digital camera 10 is formed in a thin box shape that can be held by one hand.

As shown in FIG. 1, imaging lenses 14, a flash 16, a speaker 18, an AF fill light lamp 20, and the like are arranged on the front side of the camera body 12. A shutter button 22, a mode lever 24, a power button 26, and the like are arranged on the upper side.

Meanwhile, as shown in FIG. 2, a monitor 28, a zoom button 30, a reproduction button 32, a grouping execution button 34, arrow buttons 36, a MENU/OK button 38, a DISP/BACK button 40, and the like are arranged on the back side of the camera body 12. An external connection terminal 42 is arranged on a lateral side.

Although not shown, a tripod screw hole and a freely openable and closable battery cover are arranged on the bottom side of the camera body 12. A battery accommodation chamber for accommodating a battery and a memory card slot for installing a memory card are arranged inside the battery cover.

The imaging lenses 14 are constituted by a collapsible zoom lens and are drawn out from the camera body 12 when the power of the digital camera 10 is turned on. A zoom mechanism and a collapsible mechanism of the imaging lenses 14 are known techniques, and the specific configurations will not be described here.

Constituted by a xenon tube, the flash 16 emits light as necessary when a dark subject is photographed or during backlight.

Constituted by, for example, a high-luminance LED, the AF fill light lamp 20 emits light as necessary during AF.

The shutter button 22 is constituted by a two-stroke type press switch capable of so-called "half press" and "full press". When the shutter button 22 is half-pressed, the digital camera 10 executes imaging preparation processes, in other words, processes of AE (Automatic Exposure), AF (Auto Focus), and AWB (Automatic White Balance). When the shutter button 22 is full-pressed, the digital camera 10 executes an imaging/recording process of an image.

The mode lever 24 is used to set an imaging mode. The mode lever 24 is arranged to be rotatable around the shutter button 22 and can be set to "SP location", "AUTO location", "M location", and "video location". When the mode lever 24 is set to "SP location", the digital camera 10 is set to a "scene position imaging mode" and is set to a mode of controlling the exposure and imaging according to the imaging scene. When the mode lever 24 is set to "AUTO location", the digital camera 10 is set to an "auto imaging mode" and is set to a mode of fully automatically controlling the exposure. When the mode lever 24 is set to "M location", the digital camera 10 is set to a "manual imaging mode" and is set to a mode of manually setting the exposure. When the mode lever 24 is set to "video location", the digital camera 10 is set to a "video imaging mode" and is set to a mode of imaging a video.

Examples of prepared "scene position imaging mode" include a "person imaging mode" for imaging persons, a "landscape imaging mode" for imaging landscapes, a "sport imaging mode" for imaging sports, a "night scene imaging mode" for imaging night scenes, a "close-up imaging mode" for performing close-up imaging, and an "underwater imaging mode" for performing underwater imaging, and the modes can be set on a menu screen.

The power button 26 is used to turn on/off the power of the digital camera 10, and the power of the digital camera 10 is turned on/off when the power button 26 is pressed for a predetermined time (for example, two seconds).

The monitor 28 is constituted by a color LCD. The monitor 28 is used to reproduce and display photographed images and is used as a GUI during various settings. The monitor 28 is also used as an electronic finder, displaying a live view of an image captured by the imaging element during imaging.

The zoom button 30 is used to instruct zooming of the imaging lenses 14 and reproduced images and is constituted by a zoom tele button for instructing zooming to the telephoto side and the magnification side as well as a zoom wide button for instructing zooming to the wide side and the reduction side.

The reproduction button 32 is used to instruct switching to a reproduction mode. More specifically, the digital camera 10 switches to the reproduction mode when the reproduction button 32 is pressed during imaging. The digital camera 10 is activated in the state of the reproduction mode when the reproduction button 32 is pressed in the state of power OFF.

The grouping execution button 34 is used to execute a process of classifying images photographed and stored in an internal memory (a flash ROM 118), create a file (a multi-image file: hereinafter called an "MP file") formed by connecting the classified group-by-group images, and instructing recording of the MP file in a recording medium (a memory card 152). The grouping execution button 34 may be substituted by a user interface for selecting grouping from the menu screen and operating an OK button to instruct the grouping.

The arrow buttons 36 can be pressed and operated in vertical and horizontal four directions, and a function corresponding to the setting state of the camera is allocated to each direction.

For example, during imaging, a function of switching ON/OFF of the macro function is allocated to the left button, and a function of switching the flash mode is allocated to the right button. A function of changing the brightness of the monitor 28 is allocated to the up button, and a function of switching ON/OFF of a self-timer is allocated to the down button.

During reproduction, a frame advance function is allocated to the left button, and a frame back function is allocated to the right button.

During various settings, a function of moving the cursor displayed on the monitor 28 in the directions of the buttons is allocated.

In the digital camera 10 of the present embodiments, an auto light emission mode (flash is automatically emitted according to the imaging scene), a mandatory light emission mode (flash is mandatorily emitted), a light emission prohibition mode (light emission is prohibited), a slow synchro mode (slow shutter imaging is performed), a red eye reduction light emission mode (red eye reduction process is executed), and a double exposure shot mode (two images including an image with flash turned ON and an image with flash turned OFF are taken by one recording instruction (full press of the shutter button) are prepared for the flash mode. The mode is sequentially switched every time the right button of the arrow buttons 36 is pressed.

The MENU/OK button 38 is used to call out the menu screen (MENU function) and is used for the confirmation of the content of selection, the instruction of the execution of processing, and the like (OK function). The allocated functions are switched according to the setting state of the digital camera 10.

On the menu screen, various functions included in the digital camera 10 are set, such as setting of the image size (the number of recorded pixels), setting of the sensitivity, setting of the recording system (compressed/RAW image data recording), setting of the white balance, setting of the photometric system, setting of the AF system, setting of the self-timer, setting of the digital zoom function, setting of the continuous imaging function, and setting of DPOF.

Furthermore, the type of classification information for determining the group of images can be arbitrarily set on the menu screen. For example, "face detection", "imaging mode", and "imaging location" serve as the classification information in the embodiments. One or more pieces of the classification information can be selected on the menu screen, and the OK button can be pressed to determine the classification information.

For example, if "face detection" is selected, a grouping process of images is executed depending on whether faces are detected in the images. If "imaging mode" is selected, a grouping process of images is executed in accordance with the imaging mode, such as the person imaging mode, the landscape imaging mode, the sport imaging mode, the night scene imaging mode, the close-up imaging mode, the underwater imaging mode, and the like. If "imaging location" is selected, the images are grouped according to the imaging locations.

If two or more of "face detection", "imaging mode", and "imaging location" are selected, a grouping process of images is executed according to the selected classification information. For example, if "face detection" and "imaging mode" are selected, the grouping process is executed so that images in which faces are detected and which are taken by setting the imaging mode, images in which faces are detected and which are taken without setting the imaging mode, and images in which faces are not detected and which are taken by setting the imaging mode are classified into different groups.

The grouping process of images may be executed in accordance with predetermined priorities if a plurality of pieces of information are selected as the classification information. For example, if the priority of "face detection" is set higher than the priority of "imaging mode", the grouping process may be executed so that the images in which faces are detected and which are taken by setting the imaging mode are classified into the same group that is for images in which faces are detected, regardless of the imaging mode during photographing of the images. Specific examples of the grouping process of images and the like will be described later.

The DISP/BACK button 40 is used to instruct switching of the content of display of the monitor 28 (DISP function) and is used to instruct cancelling of input operation and the like (BACK function). Allocated functions are switched according to the setting state of the digital camera 10.

The external connection terminal 42 is a communication interface (such as USB and IEEE1394) for connecting the camera to an external device, such as a personal computer and a printer. The digital camera 10 can be connected to an external device, such as a personal computer, by connecting a dedicated cable to the external connection terminal 42.

Figure 3:
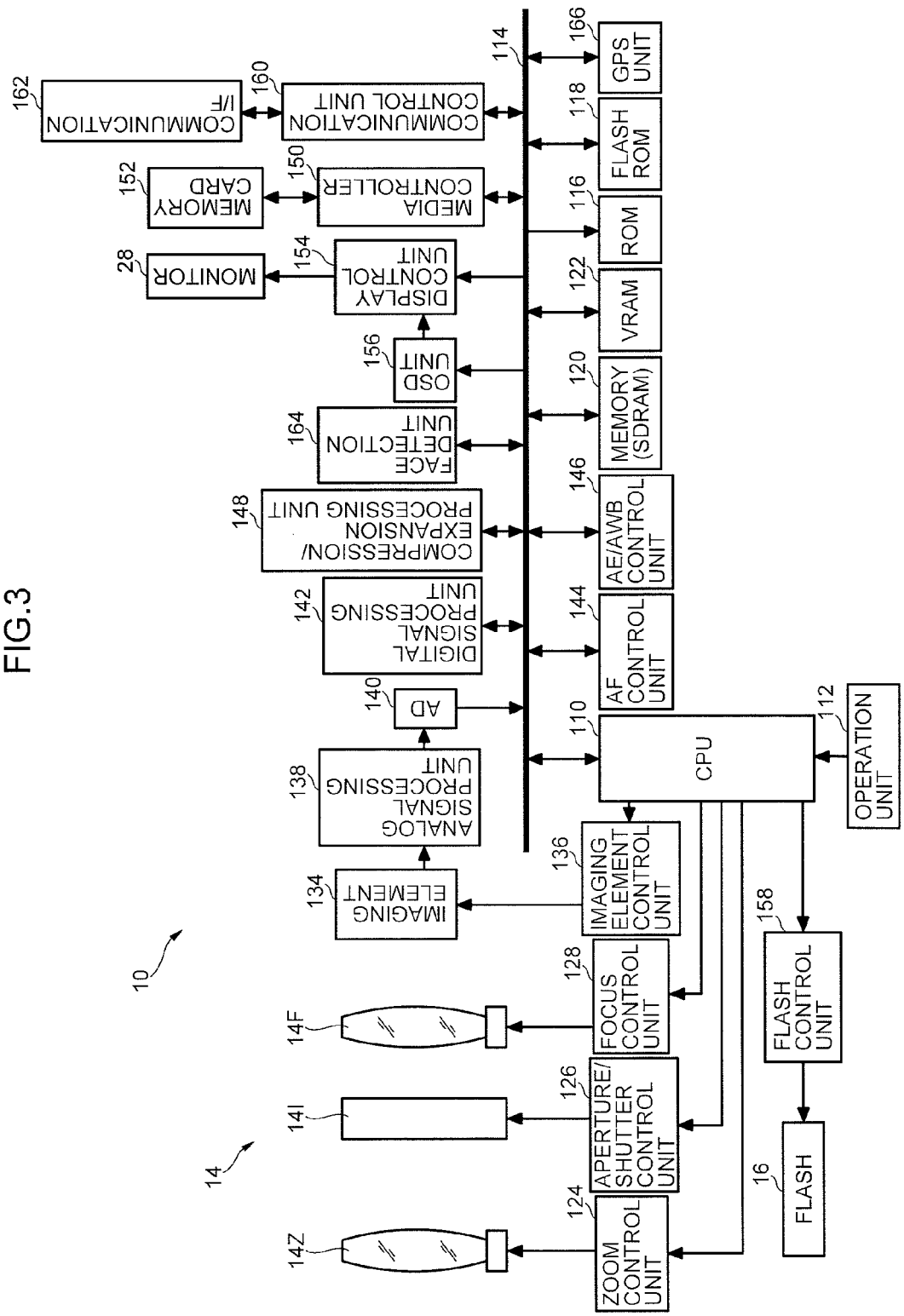
FIG. 3 is a block diagram showing an electrical configuration of the digital camera of the present embodiments.

FIG. 3 is a block diagram showing an electrical configuration of the digital camera 10 of the present embodiments.

As shown in FIG. 3, the digital camera 10 is constituted by comprising a CPU 110, an operation unit (such as the shutter button 22, the mode lever 24, the power button 26, the zoom button 30, the reproduction button 32, the grouping execution button 34, the arrow buttons 36, the MENU/OK button 38, and the DISP/BACK button 40) 112, a ROM 116, the flash ROM 118, a memory (SDRAM) 120, a VRAM 122, the imaging lenses 14, a zoom control unit 124, an aperture/shutter control unit 126, a focus control unit 128, an imaging element 134, an imaging element control unit 136, an analog signal processing unit 138, an A/D converter 140, a digital signal processing unit 142, an AF detection unit 144, an AE/AWB detection unit 146, a compression/expansion processing unit 148, a media controller 150, a memory card (recording medium) 152, a display control unit 154, an OSD (On-Screen Display) unit 156, the monitor 28, a flash control unit 158, the flash 16, a communication control unit 160, a communication interface 162, a face detection unit 164, a GPS (Global Positioning System) unit 166, and the like.

The CPU 110 functions as a control unit that administers and controls the entire operation of the digital camera 10. The CPU 110 controls the units in accordance with predetermined control programs based on input from the operation unit 112.

The ROM 116 connected through the bus 114 stores the control programs executed by the CPU 110, various data necessary for the control, and the like. The flash ROM 118 stores various setting information related to the operation of the digital camera 10, such as user setting information, as well as image files and the like. More specifically, the flash ROM 118 also functions as an internal memory, and an image file obtained by imaging is stored in the flash ROM 118 if the flash ROM 118 is designated as the storage location of the image file.

The memory (SDRAM) 120 is used as an arithmetic operation area of the CPU 110 and is used as a temporary storage area of image data. The VRAM 122 is used as a temporary storage area dedicated to image data for display.

The imaging lenses 14 are constituted by including a zoom lens 14Z, an aperture/shutter unit 14I, a focus lens 14F, and the like.

The zoom lens 14Z is driven by a zoom lens actuator not shown to move back and forth along the optical axis. As a result, the focal distance of the imaging lenses 14 changes. The CPU 110 controls the drive of the zoom lens actuator through the zoom control unit 124 to control the movement of the zoom lens 14Z to perform zooming.

The focus lens 14F is driven by a focus lens actuator not shown to move back and forth along the optical axis. As a result, the image forming location of the imaging lenses 14 changes. The CPU 110 controls the drive of the focus lens actuator through the focus control unit 128 to control the movement of the focus lens 14F to perform focusing.

The aperture/shutter unit 14I comprises an aperture and a mechanical shutter not shown. The aperture is driven by an aperture actuator not shown included in the aperture/shutter unit 14I to operate. As a result, the incident light amount to the imaging element 134 is adjusted. The CPU 110 controls the drive of the aperture actuator through the aperture/shutter control unit 126 to control the operation of the aperture to control the incident light amount (aperture value) to the imaging element 134. The mechanical shutter is driven by a shutter actuator not shown included in the aperture/shutter unit 14I to operate. In this way, the imaging element 134 is exposed/shielded. The CPU 110 controls the drive of the shutter actuator through the aperture/shutter control unit 126 to control the operation of the mechanical shutter to control the exposure/shielding of the imaging element 134.

The imaging element 134 is constituted by a color CCD with a predetermined color filter array, a color CMOS sensor, and the like (color CCD in the present example (for example, a Bayer array or a honeycomb array)). The CPU 110 drives the imaging element 134 through an imaging element drive unit 134 to output a subject image taken through the imaging lenses 14 as an image signal.

The analog signal processing unit 138 applies a correlated double sampling process to the image signal outputted from the imaging element 134 and amplifies the image signal.

The A/D converter 140 converts the analog image signal outputted from the analog signal processing unit 138 to a digital image signal.

The digital signal processing unit 142 imports the image signal outputted from the A/D converter 140 in accordance with a command from the CPU 110 and applies predetermined signal processing to the image signal to generate a Y/C image signal made of a luminance signal Y and color difference signals Cr and Cb. In accordance with a command from the CPU 110, the digital signal processing unit 142 also applies various image processes, such as a tone correction process and a gradation correction process, to the Y/C image signal.

The AF detection unit 144 imports image signals of R, G, and B colors outputted from the A/D converter 140 to calculate a focus evaluation value necessary for AF control. The AF detection unit 144 includes a high-path filter that passes only high-frequency components of the G signal, an absolute value calculation processing unit, a focus area extraction unit that cuts out a signal in a predetermined focus area set on the screen, and an integration unit that integrates absolute value data in the focus area. The AF detection unit 144 outputs the absolute value data in the focus area integrated by the integration unit to the CPU 110 as a focus evaluation value.

During AF control, the CPU 110 searches a position where the focus evaluation value outputted from the AF detection unit 144 is the maximum and moves the focus lens 14F to the position to focus the main subject. More specifically, during AF control, the CPU 110 moves the focus lens 14F from the closest range to the infinity and sequentially acquires the focus evaluation values from the AF detection unit 144 at certain intervals in the course of the movement. The CPU 110 detects the position where the focus evaluation value is the maximum, determines the position where the detected focus evaluation value is the maximum as the focus position, and moves the focus lens 14F to the position. As a result, the imaging lenses 14 are focused on the subject (main subject) located in the focus area.

If the position where the focus evaluation value is the maximum is not detected (for example, during low contrast), the CPU 110 determines that there is an AF error and issues a predetermined warning (for example, displays an error message on the monitor 28).

The AE/AWB detection unit 146 imports the image signals of R, G, and B colors outputted from the A/D converter 140 and calculates an integrated value necessary for AE control and AWB control. More specifically, the AE/AWB detection unit 146 divides one screen into a plurality of areas (for example, 8×8=64 areas) and calculates the integrated value of R, G, and B signals for each divided area.

During AE control, the CPU 110 acquires the integrated value of the R, G, and B signals of each area calculated by the AE/AWB detection unit 146 and calculates the brightness (photometric value) of the subject to set the exposure for obtaining an appropriate exposure amount. More specifically, the CPU 110 sets the sensitivity, the aperture value, the shutter speed, and the necessity of flashlight emission.

During AWB control, the CPU 110 adds the integrated value of the R, G, and B signals of each area calculated by the AE/AWB detection unit 146 to the digital signal processing unit 142. The digital signal processing unit 142 calculates a gain value for white balance adjustment based on the obtained integrated value and detects the light source type.

The compression/expansion processing unit 148 applies a compression process in a predetermined format (for example, JPEG format) to the inputted image data in accordance with a command from the CPU 110 to generate compressed image data. The compression/expansion processing unit 148 also applies an expansion process in a predetermined format to the inputted compressed image data in accordance with a command from the CPU 110 to generate uncompressed Y/C image data.

The photographed image can also be recorded as RAW image data. In this case, the compression process is not executed, and image data after A/D conversion is recorded in the memory card 152 in a predetermined file format.

The media controller 150 controls reading/writing of data to and from the memory card 152 in accordance with a command from the CPU 110. The memory card 152 is removably loaded on a media slot arranged on the camera main body as described above.

The display control unit 154 controls display on the monitor 28 in accordance with a command from the CPU 110. More specifically, the display control unit 154 converts the inputted image signal to a signal format for display on the monitor 28 in accordance with a command from the CPU 110 and outputs the signal to the monitor 28. The display control unit 154 also mixes an OSD signal of characters, drawings, symbols, and the like added from the OSD unit 156 with the image signal in accordance with a command from the CPU 110 and outputs the signal to the monitor 28.

The OSD unit 156 includes a character generator, and in accordance with a command from the CPU 110, generates a signal (OSD signal) of characters (such as warning message, image information (such as aperture, sensitivity, and shutter speed), imaging date/time, the number of images that can be taken, and file name), drawings (face detection frame and imaging assist lines), symbols (focus frame, battery power mark, and the like) and so forth displayed on the monitor 28. The OSD signal generated by the OSD unit 156 is outputted to the display control unit 154, mixed with the image signal, and outputted to the liquid crystal monitor 28. As a result, character information and the like are displayed over the photographed images and reproduced images.

The flash control unit 158 controls emission of the flash 16 in accordance with a command from the CPU 110.

The communication control unit 160 controls communication with external devices connected through the communication interface 162 in accordance with a command from the CPU 110. The digital camera 10 is recognized as a storage device when connected to a personal computer through the communication interface 162, and the data stored in the memory card 152 can be transmitted and received.

The face detection unit 164 operates when the face detection mode is set, detects whether there is a face in a live view image, and detects the location, the size, and the like of the face if a face is detected. In the face detection, the face, eyes, pupils, nose, mouth, and the like are detected, and the face of the subject is detected by identifying the feature points and patterns. A known method, such as a face detection method based on edge detection or shape pattern detection, a feature point vector approximation method of converting the target feature points to vectors and performing approximation detection of the feature point vectors, a face detection method based on hue detection or skin color detection, and the like can be used as a specific method of face detection.

The location and the size of the detected face are used to set the exposure and the focus (AE and AF) on the face, and information, such as the presence/absence of face detection, is recorded in the header of the file of the photographed image.

The GPS unit 166 acquires radio waves sent from a plurality of satellites for GPS (not shown) to measure the current latitude, longitude, altitude, and the like. The GPS information, such as the measured current latitude and altitude, is recorded in the header of the file of the photographed image as the location information of imaging.

Next, processing operations by the digital camera 10 of the present embodiments configured this way will be described.

First Embodiment

Figure 4:
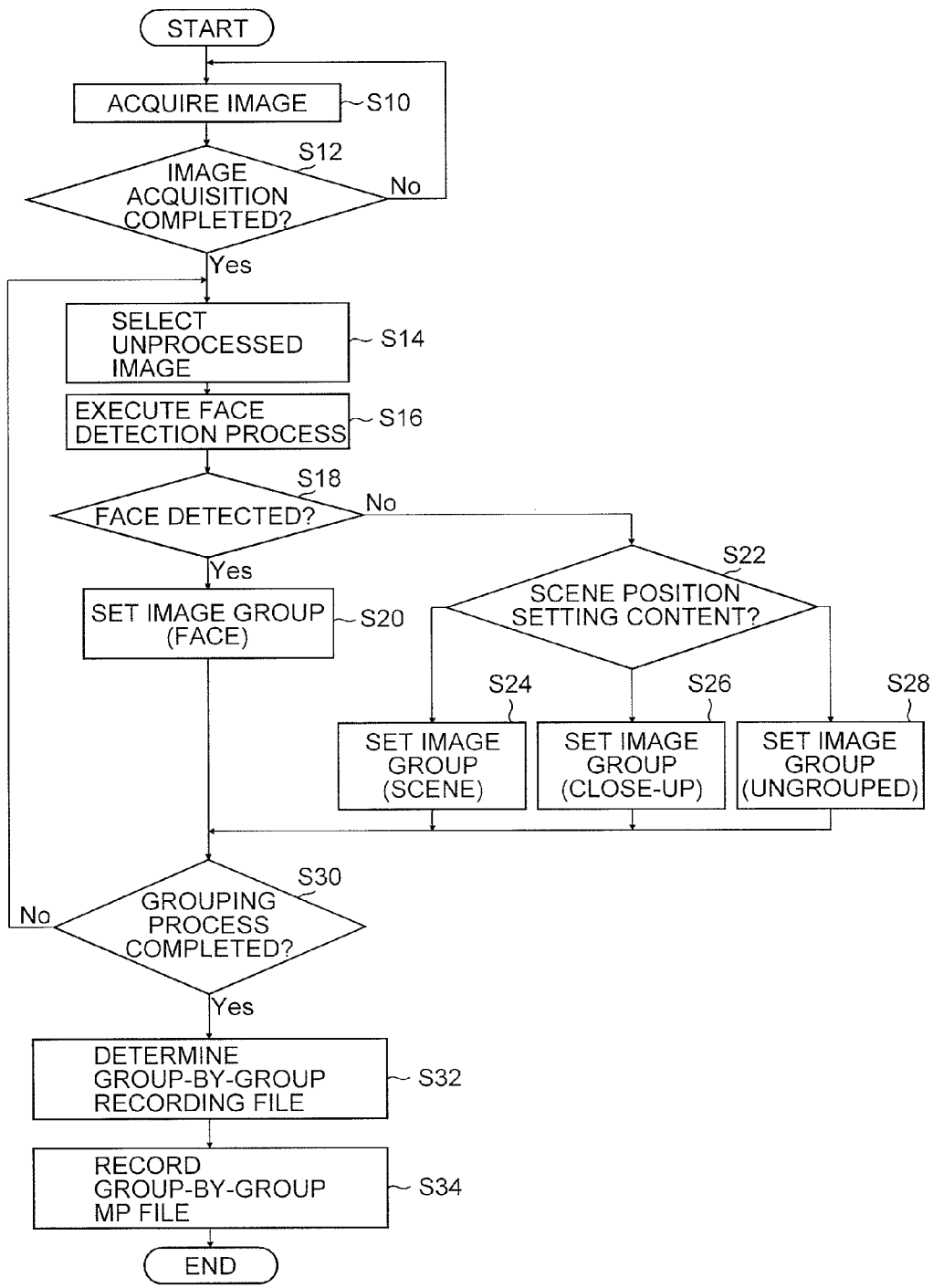
FIG. 4 is a flow chart showing a first embodiment of an image recording method according to the present invention.

FIG. 4 is a flow chart showing a first embodiment of an image recording method according to the present invention. The first embodiment shows a case of continuous imaging for taking a plurality of images by one release operation of the shutter button 22 as well as interval imaging. It is assumed that "face detection" and "imaging mode" are set in advance as the classification information of image on the menu screen and the like.

First, a series of images are acquired by imaging in the continuous imaging mode (steps S10 and S12).

Subsequently, an unprocessed image (a target image to which a grouping process described below is not applied) is selected from the plurality of acquired images (step S14), and a face detection process is applied to the target image (step S16). If the face detection mode is set and the face detection process is executed during imaging of a live view image, the process of step S16 is not executed, and the processing result in the face detection mode can be used.

Whether a face is detected from the target image is determined based on the face detection processing result (step S18). If it is determined that a face is detected, the target image is set to a face group (step S20).

On the other hand, if it is determined that a face is not detected, which imaging mode is set as the "scene position imaging mode" during imaging of the target image is determined (step S22). If it is determined that the landscape imaging mode is set as the imaging mode, the target image is set to a landscape group in step S24. If it is determined that the close-up imaging mode is set, the target image is set to a close-up group in step S26. In other cases, the target image is set to an ungrouped image group in step S28.

Although the groups classified by the scene positions are groups of "landscape" and "close-up" in the embodiment, the groups are not limited to these. The groups may be set by various imaging modes, such as a "night scene imaging mode", a "sport imaging mode", an "underwater imaging mode", a "sunset imaging mode", and a "snow imaging mode".

Whether the grouping process of the acquired images is completed is determined (step S30). The process returns to step S14 if the grouping process is not completed, and the grouping process is repeated. The process moves to step S32 if the grouping process is completed.

In step S32, group-by-group recording files are determined for the images to which the grouping process is applied. The determination of the group-by-group recording file denotes determination of a file name and a folder for recording the file for each image group for which recording is necessary.

Subsequently, an MP file is created and recorded group by group (step S34).

Figure 5:
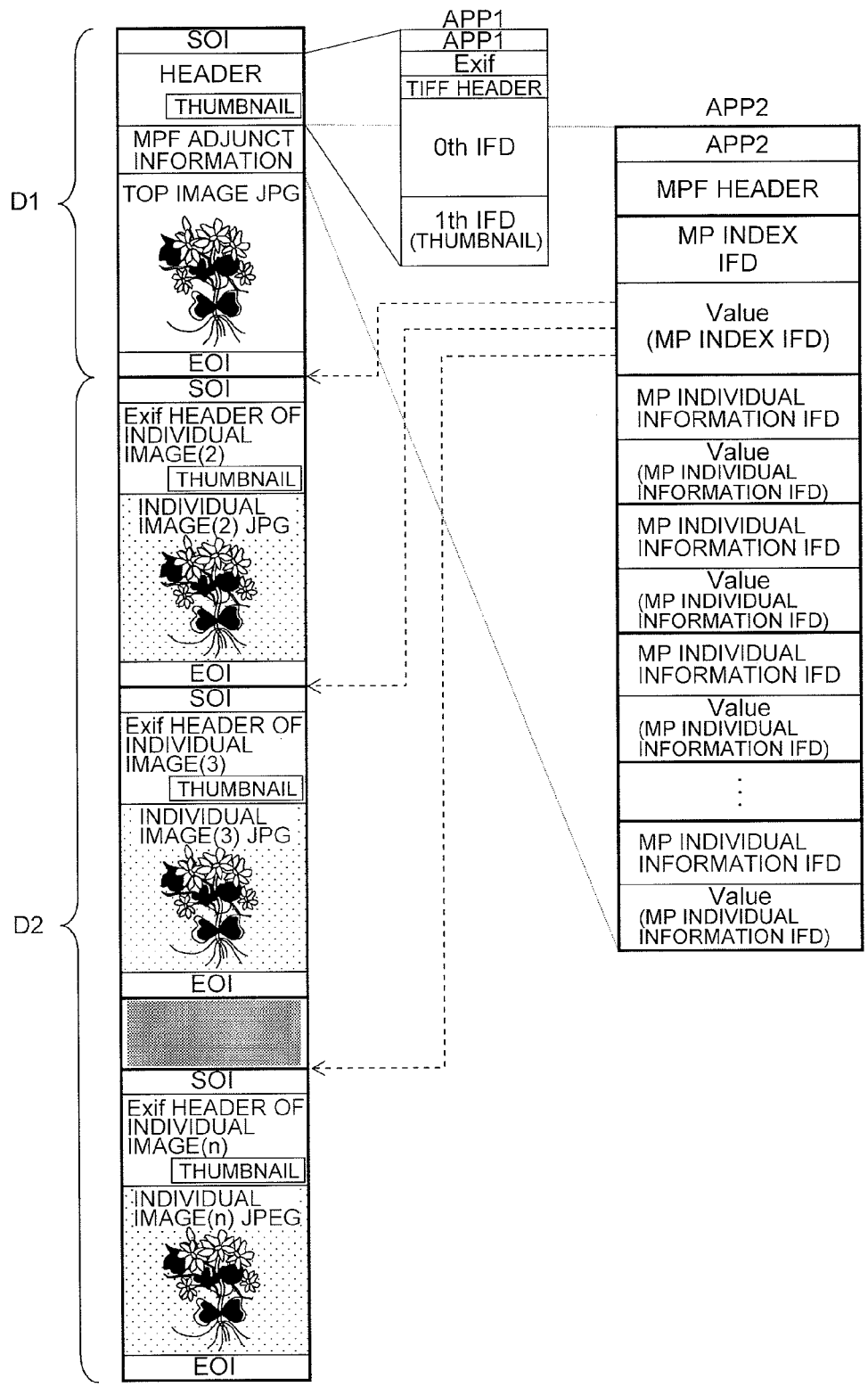
FIG. 5 is a diagram showing an example of a file configuration of an MP file.

FIG. 5 is a diagram showing an example of a file configuration of the MP file.

As shown in FIG. 5, the MP file is obtained by connecting a plurality of group-by-group images to form one file. The MP file includes a top image area D1 and a connected individual image area D2. The individual image area D2 is an area where images, headers, and the like of the second and subsequent images are individually stored. The data configurations (Exif standard) of the connected images and the like are maintained and stored in the individual image area D2 in the order of connection. In that case, an SOI marker is recorded at the top of the data of each connected image, and an EOI marker is recorded at the end. As a result, the start and the end of each image can be recognized.

The top image area D1 is an area where the top image, the header, and the like are stored. The top image area D1 is constituted in accordance with the Exif standard. Therefore, even if a reproducer cannot recognize the MP file, at least the top image stored in the top image area D1 can be displayed if the reproducer can recognize the file structure of the Exif file and can reproduce the images by assuming the MF file as the Exif file.

An MPF adjunct information area arranged at the header section of the top image area D1 stores individual image area presence/absence information indicating whether the present file (MP file) includes the individual image area D2, and if the individual image area D2 is included, stores information (pointers) indicating the storage places of Index information of individual images and individual image identifications IFD (1), . . . , IFD (n) indicating the storage places of the individual images (addresses of the SOI markers of the individual images). Therefore, the reproducer capable of recognizing the MP file can read the MPF adjunct information area to recognize the storage locations of the images.

As described, the top image area D1 is constituted in accordance with the Exif standard. Therefore, even the reproducer that cannot recognize the MP file can read out the information of the top image area D1 to display the images on the monitor.

Even in the MP file, the individual image area D2 is not connected if there is only one image.

Returning to FIG. 4, the MP file configured this way is created in step S34 and is recorded in the memory card 152. Ungrouped images (images which are not to be grouped) are recorded in the memory card 152 as a non-MP file (image file of normal Exif standard). The ungrouped images may be set to an ungrouped group and recorded in the MP file.

Second Embodiment

Figure 6:
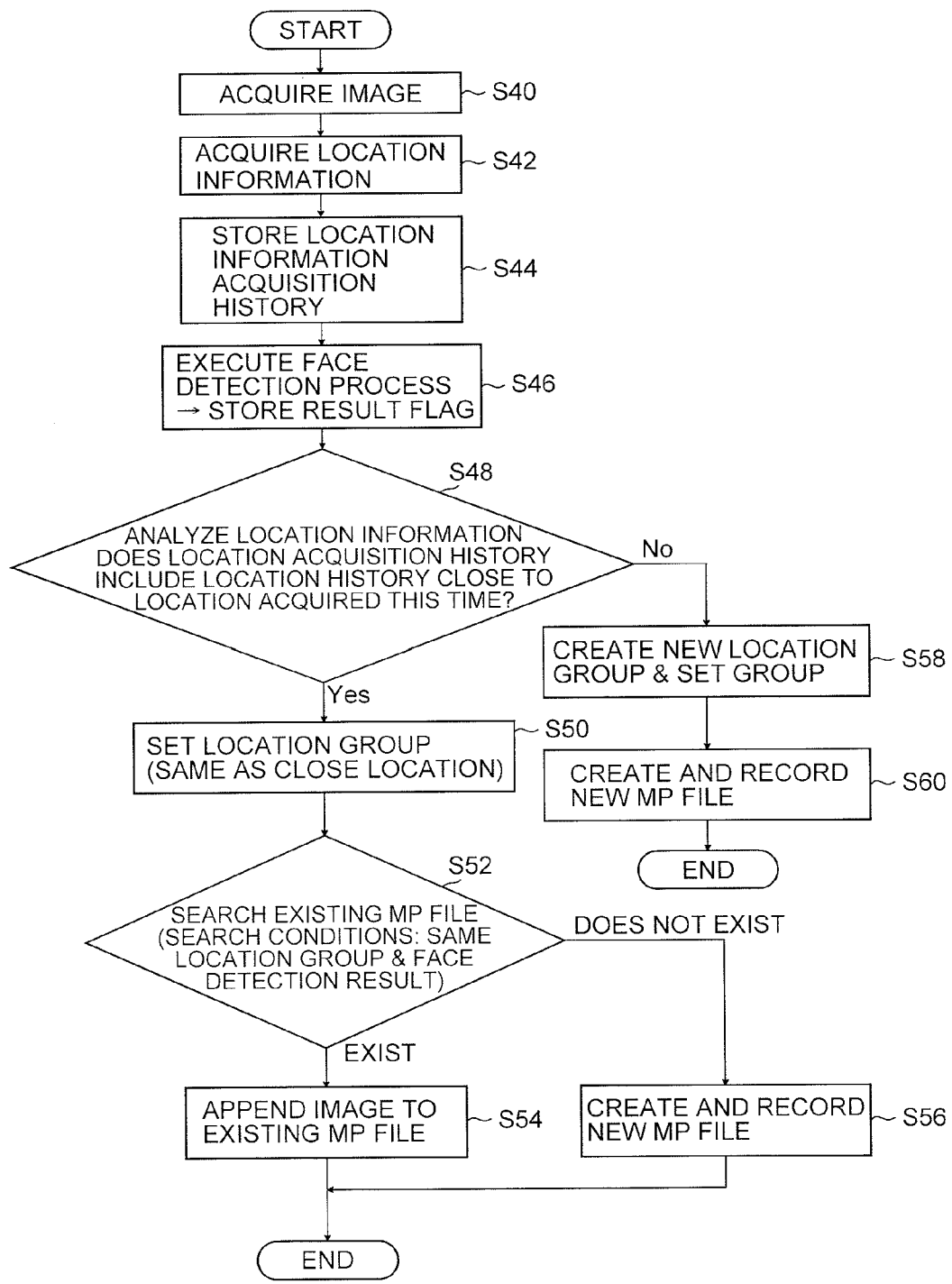
FIG. 6 is a flow chart showing a second embodiment of the image recording method according to the present invention.

FIG. 6 is a flow chart showing a second embodiment of the image recording method according to the present invention. The second embodiment shows a case of taking one image by one release operation of the shutter button 22 and recording the image. It is assumed that "face detection" and "imaging location" are set in advance as the classification information of image on the menu screen and the like.

When an image is taken by a release operation of the shutter button 22, the photographed image is acquired (step S40), and GPS information (location information of latitude and longitude) is acquired from the GPS unit 166 (step S42). The acquired location information is stored in a location information history management unit arranged in the flash ROM 118 (or the memory card 152) as a location information acquisition history (step S44). A face detection process is applied to the acquired image to be processed, and a result flag of the face detection process (for example, face flag "1" if a face is detected and face flag "0" if a face is not detected) is temporarily stored in the work memory or the like (step S46).

The location information of the target image acquired this time and the location information of the images taken in the past stored in the location information acquisition history are compared, and whether there is a history of an imaging location close to the imaging location this time is determined (step S48). Whether the imaging location is close can be determined based on whether there is a history of location information within a predetermined range of latitude and longitude based on the location information (latitude and longitude) of the target image acquired this time.

If it is determined that there is a history of an imaging location close to the imaging location this time, the target image is set to the same location group as the close image (existing location group) (step S50). To prevent the same location group from being infinitely enlarged, it is preferable to compare the imaging location this time and the center location of each location group based on the center location of the same location group.

Subsequently, an existing MP file in the same location group as the target image acquired this time and with the same face detection result is searched (step S52). The existing MP file in the memory card 152 (or the flash ROM 118) can be searched by associating the file name, the location information acquisition history, and the face detection result of the MP file created in the past and managing the information by the above mentioned location information history management unit or the like.

If the existing MP file is found, the target image this time is appended to the MP file (step S54). If the existing MP file is not found, a new MP file including the target image this time as the top image is created, and the new MP file is recorded in the memory card 152 (or the flash ROM 118) (step S56).

On the other hand, if it is determined in step S48 that there is no history of an imaging location close to the imaging location this time, a new location group corresponding to the target image is created, and a location group classified by the face detection result (face flag) is set (step S58). As in step S56, a new MP file including the target image this time as the top image is created, and the new MP file is recorded in the memory card 152 (or the flash ROM 118) (step S60).

Third Embodiment

Figure 7:
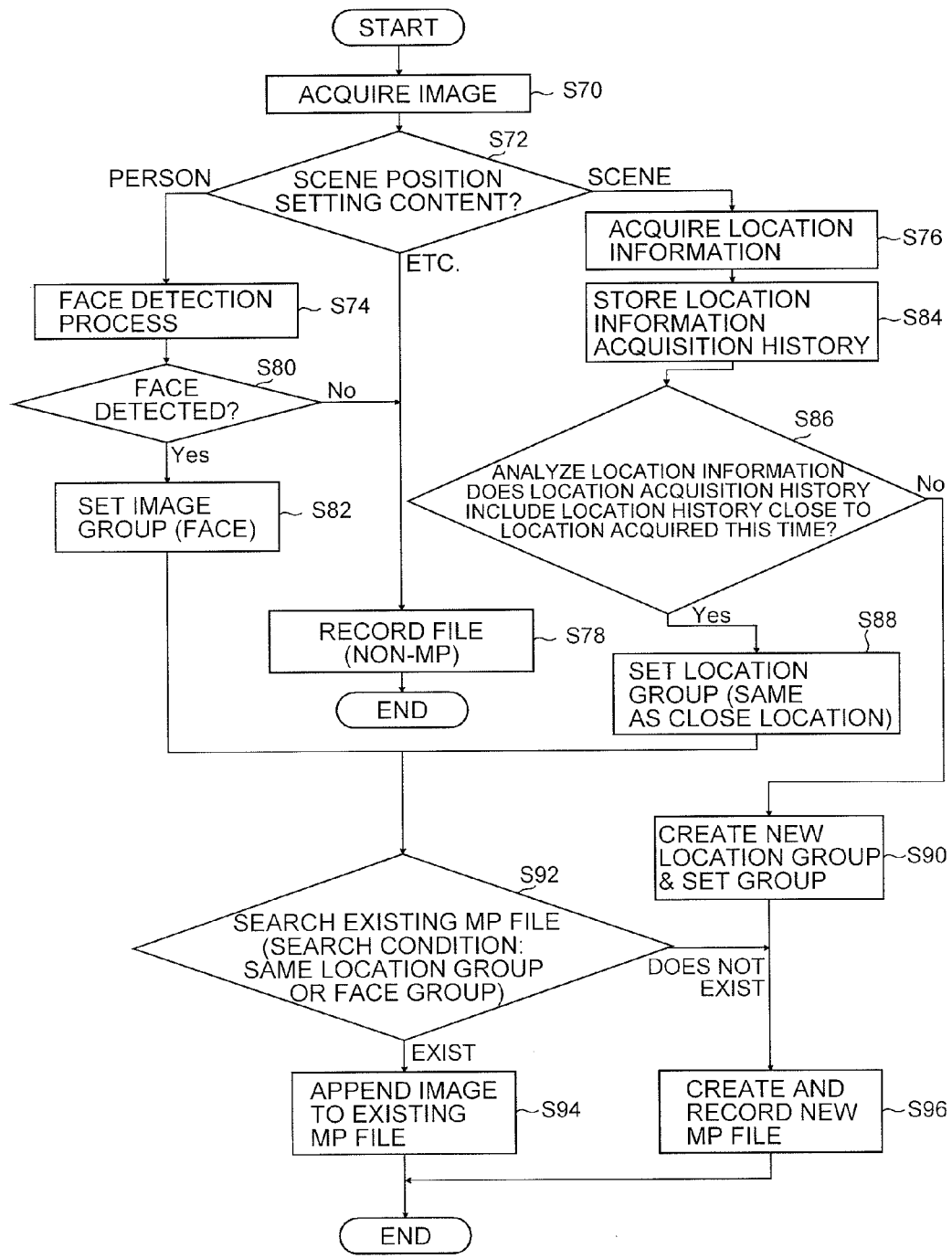
FIG. 7 is a flow chart showing a third embodiment of the image recording method according to the present invention.

FIG. 7 is a flow chart showing a third embodiment of the image recording method according to the present invention. The third embodiment shows a case of taking one image by one release operation of the shutter button 22 and recording the image. It is assumed that "imaging mode", "face detection", and "imaging location" are set in advance as the classification information of image on the menu screen and the like.

When an image is taken by a release operation of the shutter button 22, the taken image is acquired (step S70), and the imaging mode during photographing of the acquired image is determined (step S72). The process moves to step S74 if it is determined that the imaging mode of the target image is the person imaging mode. The process moves to step S76 if it is determined that the imaging mode is the landscape imaging mode. The process moves to step S78 if it is determined that the imaging mode is another imaging mode (imaging mode of another scene position, auto imaging mode, manual imaging mode, or continuous imaging mode).

The face detection process is applied to the target image in step S74. Whether a face is detected from the target image is determined based on the face detection processing result (step S80). If it is determined that a face is detected, the target image is set to the face group (step S82). If it is determined that a face is not detected, the process moves to step S78.

In step S78, the target image is set as an ungrouped image to form a non-MP file (image file of normal Exif standard) and recorded in the memory card 152.

Meanwhile, location information is acquired from the GPS unit 166 in step S76. The location information is stored in the location information history management unit arranged in the flash ROM 118 (or the memory card 152) as a location information acquisition history, and the process moves to step S86 (step S84).

In step S86, the location information of the target image acquired this time and the location information of the images taken in the past stored in the location information acquisition history are compared, and whether there is a history of an imaging location close to the imaging location this time is determined. If it is determined that there is a history of an imaging location close to the imaging location this time, the target image is grouped in the same location group (existing location group) as the close image (step S88).

On the other hand, if it is determined that there is no history of an imaging location close to the imaging location this time, a new location group corresponding to the target image is created to set another location group, and the process moves to step S96 (step S90).

The face group or the location group set in step S82 or step S88 is set as the search condition to search an existing MP file (step S92).

If an existing MP file is found, the target image this time is appended to the MP file (step S94). If an existing MP file is not found, the process moves to step S96. In step S96, a new MP file including the target image this time as the top image is created, and the new MP file is recorded in the memory card 152 (or the flash ROM 118).

Fourth Embodiment

Figure 8:
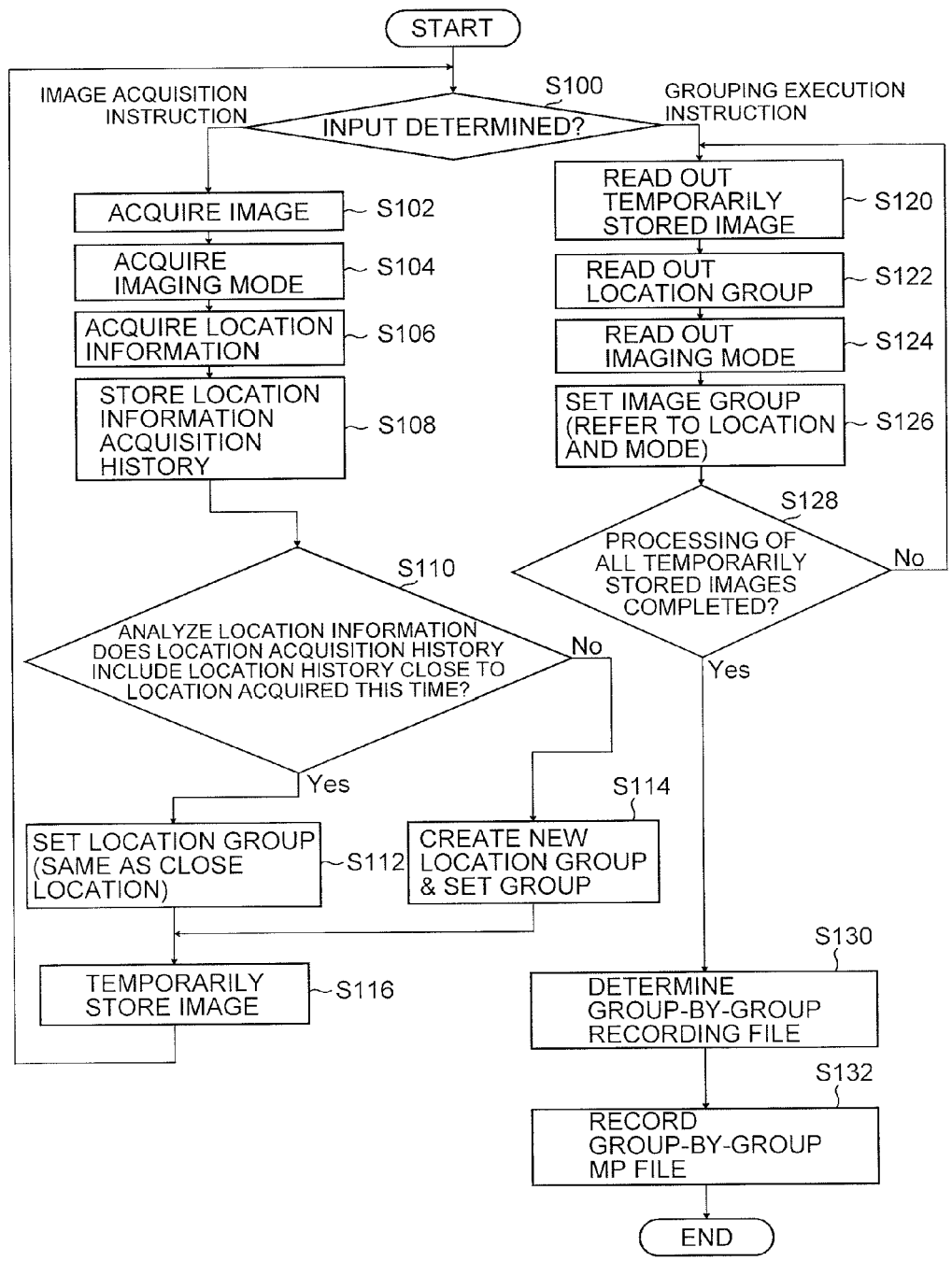
FIG. 8 is a flow chart showing a fourth embodiment of the image recording method according to the present invention.

FIG. 8 is a flow chart showing a fourth embodiment of the image recording method according to the present invention. In the first to third embodiments, the creation/recording process of the MP file and the like is triggered by the release operation of the shutter button 22 to image a new image (completion of the acquisition of the image). In the fourth embodiment, the creation/recording process of the MP file and the like is triggered by an operation of the grouping execution button 34 (see FIG. 1).

In the fourth embodiment, as described below, the photographed image is temporarily stored as a normal image file in the flash ROM 118 included in the camera. When the grouping execution button 34 is operated, the image temporarily stored in the flash ROM 118 is set as the target image to create an MP file, and the created MP file is recorded in the memory card 152.

In the fourth embodiment, it is assumed that "imaging mode" and "imaging location" are set in advance as the classification information of image on the menu screen and the like.

In FIG. 8, whether the acquisition of image is instructed by the release operation of the shutter button 22 or whether the grouping execution is instructed by the operation of the grouping execution button 34 is determined (step S100). If it is determined that the acquisition of image is instructed, the process moves to step S102. If it is determined that the grouping execution is instructed, the process moves to step S120.

In step S102, the image photographed by the image acquisition instruction is acquired. Subsequently, the imaging mode and the location information during imaging of the acquired image are acquired (steps S104 and S106). The acquired location information is stored in the location information history management unit arranged in the flash ROM 118 as a location information acquisition history (step S108).

Subsequently, the location information of the target image acquired this time and the location information of the images photographed in the past stored in the location information acquisition history are compared, and whether there is a history of an imaging location close to the imaging location this time is determined (step S110).

If it is determined that there is a history of an imaging location close to the imaging location this time, the target image is set to the same location group (existing location group) as the close image (step S112). If it is determined that there is no history of an imaging location close to the imaging location this time, a new location group corresponding to the target image is created to set another location group (step S114).

For the image acquired this time, the imaging mode acquired in step S106 and the location group set in step S112 or step S114 are temporarily stored together in the flash ROM 118 (step S116).

Meanwhile, if the grouping execution button 34 is operated and the process moves to step S120, the image temporarily stored in the flash ROM 118 is read out. The location group and the imaging mode temporarily stored together with the read out image are also read out (steps S122 and S124).

The image group of the target image is then set based on the read out location group and imaging mode (step S126). The image group is set based only on the location group for an image without the imaging mode.

Subsequently, whether a process, such as setting the image groups of all temporarily stored images, is executed is determined (S128). If the process is not completed, the process returns to step S120, and the process is repeated.

If the process, such as setting the image groups of all images, is completed, the group-by-group recording file is determined for each grouped image (step s130). An MP file is created group by group, and the created MP file is recorded in the memory card 152 (step S132). The images and the like temporarily stored in the flash ROM 118 are deleted when recording of the MP file in the memory card 152 is completed.

In the fourth embodiment, the temporarily stored images and the MP file are recorded in the flash ROM 118 and the memory card 152, respectively. However, the arrangement is not limited to this, and the images and the file may be processed within the same memory.

In the fourth embodiment, the information of the location groups and the imaging modes are recorded together with the images upon the temporary saving of the images. However, the arrangement is not limited to this, and all grouping processes may be executed when the execution of grouping is instructed. In that case, the grouping processes can be executed by acquiring various pieces of classification information from the adjunct information added to the header sections of the images.

Other Embodiments

Although the imaging mode set during photographing of image, the detected location information, and the classification information indicative of the presence/absence of face detection are acquired in the embodiments, various pieces of classification information may be acquired from the adjunct information added to the header sections of the images as described above.

Not only the presence/absence of a face in the image, the type of imaging mode, and the imaging location, but also the imaging date/time, the imaging time zone, and the like can be used as the classification information for classifying the images. It is preferable that combinations of the classification information can be set as necessary.

Furthermore, the present invention can be applied not only to the image recording device incorporated into a digital camera, but also to other devices, such as dedicated devices and personal computers, that record (store) and reproduce images.

Furthermore, the MP file includes information of all original images. Therefore, a function of restoring image-by-image files from the MP file may be added to the present image recording device. According to the function, the grouping process can be applied again to the images once connected to the MP file based on other classification information, and a new MP file can be created and recorded.

The present invention is not limited to the embodiments, and the embodiments can be combined as necessary. It is obvious that various changes can be made without departing from the scope of the present invention. For example, various changes can be considered for the mode of the grouping process.

REFERENCE SIGNS LIST

10 . . . digital camera, 12 . . . camera body, 14 . . . imaging lens, 22 . . . shutter button, 24 . . . mode lever, 34 . . . grouping execution button, 36 . . . arrow buttons, 38 . . . MENU/OK button, 42 . . . face detection button, 110 . . . CPU, 112 . . . operation unit, 116 . . . ROM, 118 . . . flash ROM (internal memory), 120 . . . memory (SDRAM), 134 . . . imaging element, 152 . . . memory card (recording medium)

The invention claimed is:

1. An image recording device comprising:
an image acquisition unit that acquires a plurality of images;
a group determination unit that determines a group of each image acquired by the image acquisition unit;
a file creating unit that connects group-by-group images classified by the groups determined by the group determination unit to create a multi-image file including a plurality of the grouped images, each of the group-by-group images which are connected and stored in the multi-image file, said multi-image file including a top image area and an individual image area, the top image area including an area in which a top image, a header of the top image and multi-image file information are stored, the individual image area being connected to the top image area and including an area in which individual images of a second and subsequent images and headers of the individual ages are stored, the multi-image file information including information indicating places in which the individual images are stored; and a recording unit that records the group-by-group multi-image file created by the file creating unit, wherein the group determination unit comprises a classification information acquisition unit that acquires, for each image acquired by the image acquisition unit, at least one of presence/absence of a face in the image, a type of imaging mode, an imaging location, imaging date/time, and an imaging time zone as classification information, the group determination unit determines the groups of the acquired images based on the acquired classification information, the classification information acquisition unit further comprises a classification information setting unit that arbitrarily sets a type of the classification information to be acquired, and the classification information acquisition unit acquires the classification information set by the classification information setting unit for each image acquired by the image acquisition unit.

2. The image recording device according to claim 1, wherein the classification information acquisition unit acquires the classification information from information set or detected during photographing of the images or acquires the classification information from attached information added to the top image area and the individual image area of the respective images.

3. The image recording device according to claim 1, wherein the group determination unit, the file creating unit, and the recording unit are triggered by the completion of the acquisition of the images by the image acquisition unit to operate.

4. The image recording device according to claim 1, wherein the image acquisition unit comprises an imaging unit that images a subject and acquires an image expressing the subject imaged by the imaging unit based on input of an imaging instruction.

5. The image recording device according to claim 1, further comprising:

an instruction input unit that instructs creation and recording of a multi-image file; and an internal memory or a recording medium recording images, wherein the image acquisition unit acquires a plurality of images from the internal memory or the recording medium, and the file creating unit and the recording unit are triggered by input of an instruction by the instruction input unit to operate.

6. The image recording device according to claim 1, wherein if the image acquisition unit acquires a new image, the group determination unit determines a group corresponding to the acquired new image, and there is no existing multi-image file corresponding to the determined group, the file creating unit creates a new multi-image file for recording the acquired new image.

7. The image recording device according to claim 1, wherein if the image acquisition unit acquires a new image, and the group determination unit determines a group corresponding to the acquired new image, the file creating unit updates an existing multi-image file corresponding to the determined group to connect the acquired new image to an image of the existing multi-image file, and the recording unit records the existing multi-image file updated by the file creating unit.

8. An image recording method comprising:

an image acquisition step of acquiring one or a plurality of images;

a group determination step of determining groups of the acquired images;

a file creation step of creating a multi-image file including a plurality of grouped images, said multi-image file formed by connecting the determined group-by-group images, each of the group-by-group images which are connected and stored in the multi-image file, said multi-image file including a top image area and an individual image area, the top image area including an area in which a top image, a header of the top image and multi-image file information are stored, the individual image area being connected to the top image area and including an area in which individual images of a second and subsequent images and headers of the individual images are stored, the multi-image file information including information indicating places in which the individual images are stored; and a recording step of recording the created group-by-group multi-image file, wherein the group determination step comprises a classification information acquisition step of acquiring, for each acquired image, at least one of presence/absence of a face in the image, a type of imaging mode, an imaging location, imaging date/time, and an imaging time zone as classification information, the groups of the acquired images are determined in the group determination step based on the acquired classification information, the classification information acquisition step further comprises a classification information setting step of arbitrarily setting a type of the classification information to be acquired, and in the classification information acquisition step, the classification information set in the classification information setting step is acquired for each image acquired in the image acquisition step.

9. The image recording method according to claim 8, wherein in the classification information acquisition step, the classification information is acquired from information set or detected during photographing of the images, or the classification information is acquired from attached information added to the top image area and the individual image area of the respective images.

10. The image recording method according to claim 8, further comprising a step of detecting the completion of the acquisition of the images in the image acquisition step, wherein the group determination step, the file creation step, and the recording step are sequentially executed when the completion of the acquisition of the images is detected.

11. The image recording method according to claim 8, wherein
- the image acquisition step comprises an imaging step of imaging a subject based on input of an imaging instruction, and
- in the image acquisition step, an image expressing the subject imaged in the imaging step is acquired.

12. The image recording method according to claim 8, further comprising:
- an instruction input step of instructing creation and recording of a multi-image file; and
- the image acquisition step of acquiring a plurality of images from an internal memory or a recording medium recording images, wherein
- the file creation step and the recording step are sequentially executed when there is input of an instruction in the instruction input step.

13. The image recording method according to claim 8, wherein
- if a new image is acquired in the image acquisition step, a group corresponding to the new image acquired in the group determination step is determined, and there is no existing multi-image file corresponding to the determined group, a new multi-image file for recording the acquired new image is created in the file creation step.

14. The image recording method according to claim 8, wherein
- if a new image is acquired in the image acquisition step, and a group corresponding to the acquired new image is determined in the group determination step, an existing multi-image file corresponding to the determined group is updated in the file creation step to connect the acquired new image to an image of the existing multi-image file, and
- the existing multi-image file updated in the file creation step is recorded in the recording step.

15. An image recording device comprising:
- an image acquisition unit configured to acquire a plurality of images;
- a group determination unit configured to determine a group of each image acquired by the image acquisition unit;
- a file creating unit configured to connect group-by-group images classified by the groups determined by the group determination unit to create a multi-image file including a plurality of the grouped images, and the multi-image file including a top image area and an individual image area, the top image area including an area in which a top image, a header of the top image and multi-image file information are stored, the individual image area being connected to the top image area and including an area in which individual images of a second and subsequent images and headers of the individual images are stored, the multi-image file information including information indicating places in which the individual images are stored; and
- a recording unit configured to record the group-by-group multi-image file created by the file creating unit, wherein:
- when the image acquisition unit acquires a new image, and the group determination unit determines a group corresponding to the acquired new image, the file creating unit updates an existing multi-image file corresponding to the determined group to connect the acquired new image to an image in the existing multi-image file, and
- the recording unit records the multi-image file updated by the file creating unit.

\* \* \* \* \*